United States Patent
LaBarge, III

(10) Patent No.: US 10,935,079 B2
(45) Date of Patent: Mar. 2, 2021

(54) BEARING GUARD AND SHAFT COVER

(71) Applicant: Machine Guard & Cover Co., Holland, MI (US)

(72) Inventor: William E. LaBarge, III, Grandville, MI (US)

(73) Assignee: Machine Guard & Cover Co, Holland, MI (US)

( * ) Notice: Subject to any disclaimer, the term of this patent is extended or adjusted under 35 U.S.C. 154(b) by 0 days.

(21) Appl. No.: 16/430,915

(22) Filed: Jun. 4, 2019

(65) Prior Publication Data

US 2019/0368547 A1    Dec. 5, 2019

Related U.S. Application Data

(60) Provisional application No. 62/680,123, filed on Jun. 4, 2018.

(51) Int. Cl.
 *F16C 35/04* (2006.01)

(52) U.S. Cl.
 CPC ................... *F16C 35/047* (2013.01)

(58) Field of Classification Search
 CPC ........ F16C 35/00; F16C 35/04; F16C 35/042; F16C 35/045; F16C 35/047; F16D 3/841–848
 See application file for complete search history.

(56) References Cited

U.S. PATENT DOCUMENTS

| | | | | |
|---|---|---|---|---|
| 4,779,484 A | * | 10/1988 | Poe | F16D 3/841 74/608 |
| 5,033,874 A | * | 7/1991 | Rouse | F16C 35/045 384/477 |
| 5,711,617 A | * | 1/1998 | Scheller | F16C 33/723 384/484 |
| 6,193,418 B1 | * | 2/2001 | Yamashita | F16C 33/723 384/130 |
| 8,025,577 B2 | | 9/2011 | LaBarge | |

OTHER PUBLICATIONS

The Pillow Block Bearing Cover and Shaft Cover website: https://machineguard.com/machine-guarding/bearing-covers/pillow-block-bearing-covers-lightweight/ and https://machineguard.com/machine-guarding/shaft-covers/double-flanged-shaft-covers-lightweight/ dated Jun. 6, 2016 and Mar. 19, 2016 (Year: 2016).*

* cited by examiner

*Primary Examiner* — Alan B Waits
(74) *Attorney, Agent, or Firm* — Price Heneveld LLP

(57) ABSTRACT

A bearing guard is provided that comprises a housing having an open end, a first face, and a second face. A first opening is defined by the first face. The first opening is configured to receive a shaft guard. A second opening is defined by the second face. A cap is positioned over the second opening and is removably coupled to the second face. The cap extends a predetermined distance from the second face.

16 Claims, 7 Drawing Sheets

BEARING GUARD AND SHAFT COVER

CROSS-REFERENCE TO RELATED APPLICATION

This patent application claims priority under 35 U.S.C. § 119(e) to U.S. Provisional Patent Application No. 62/680,123, entitled "BEARING GUARD AND SHAFT COVER," filed Jun. 4, 2018, the entire disclosure of which is incorporated herein by reference.

BACKGROUND

The present invention relates to a bearing guard and, more particularly, to a bearing guard interface with a cap for covering a bearing and rotating shafts on machinery.

Guards are often used to cover bearings and/or rotating shafts in order to prevent accidental contact with fast rotating portions of the machinery. Further, many standards require guards, such as standards by OSHA, ASME and ANSI organizations. However, guards must not only prevent accidental contact, they also must be quickly removable to allow efficient repair. Also, guards must preferably be low cost for competitive reasons. Another problem is that complex guards and/or difficult-to-install guards are soon removed from (or left off from) machinery because maintenance personnel and workers get tired of trying to work around them. One practical reason that guards become complex or expensive is because of the tendency to custom manufacture guards for each application, due to the variations and special circumstances encountered at each installation. At the same time, it is difficult to make a guard flexible enough to satisfy a variety of different physical environments, yet that is cost competitive, meets industry safety standards, and that can accommodate most variations seen at a job site.

SUMMARY OF THE PRESENT INVENTION

In one aspect of the present invention, a bearing guard is provided that comprises a housing having an open end, a first face, and a second face. A first opening is defined by the first face. The first opening is configured to receive a shaft guard. A second opening is defined by the second face. A cap is positioned over the second opening and is removably coupled to the second face. The cap extends a predetermined distance from the second face.

The first face may define first and second slots in communication with the first opening to receive the first and second laterally opposing flanges of the shaft guard. Each of the first and second faces of the housing may include a first and second step, respectively, and each of the first and second steps may define a portion of one of the first and second openings, respectively. The shaft guard may rest on the first step when the shaft guard is received by the first opening. The cap rests on the second step when the cap is positioned over the second opening. The first face defines a channel in communication with the first opening, and further wherein the channel is of a predetermined width to allow the housing to fit over a bearing and a coupling shaft.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1A:
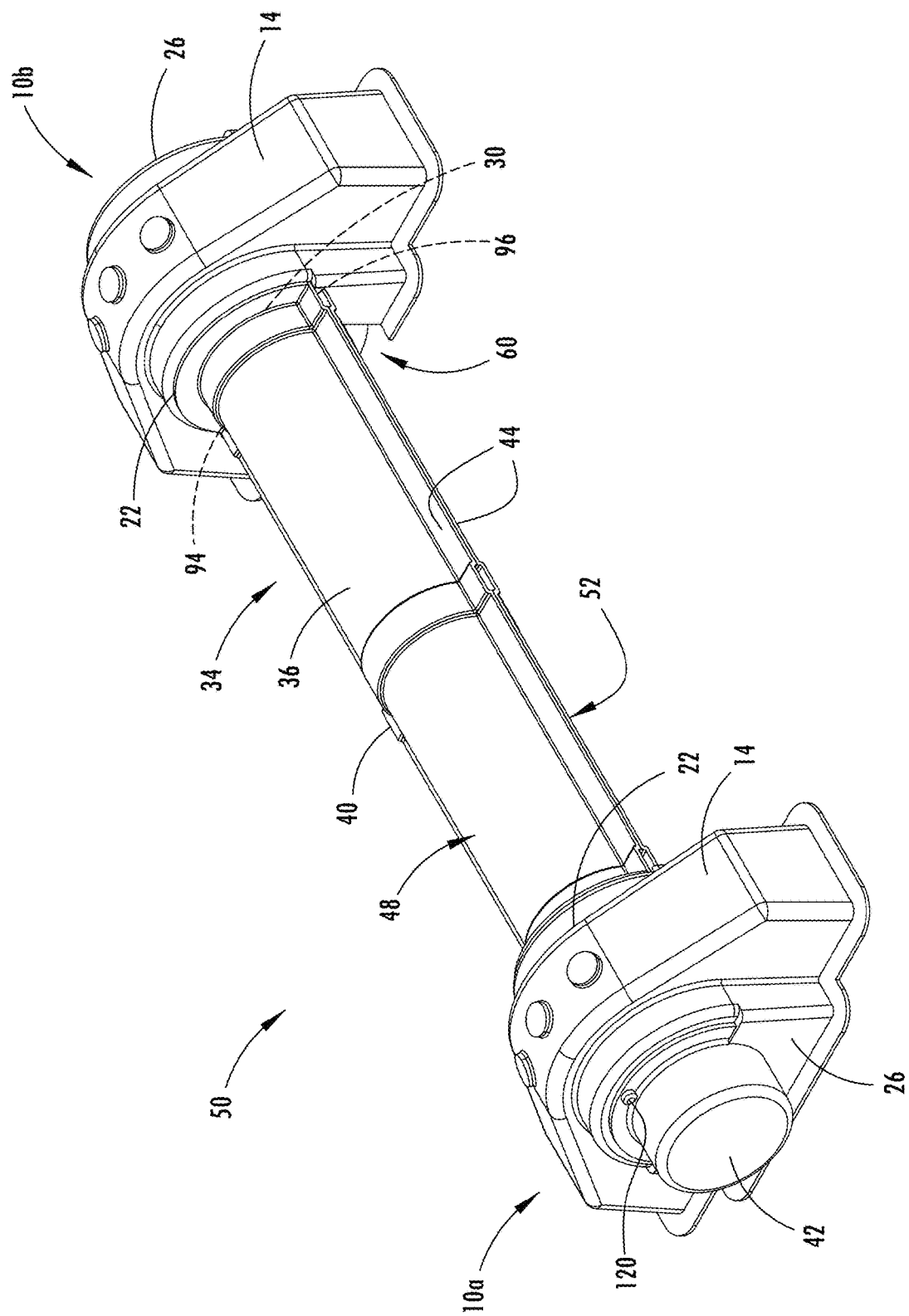
FIG. 1A is a top perspective view of a bearing and shaft guard assembly having a cap on one end.
Figure 1B:
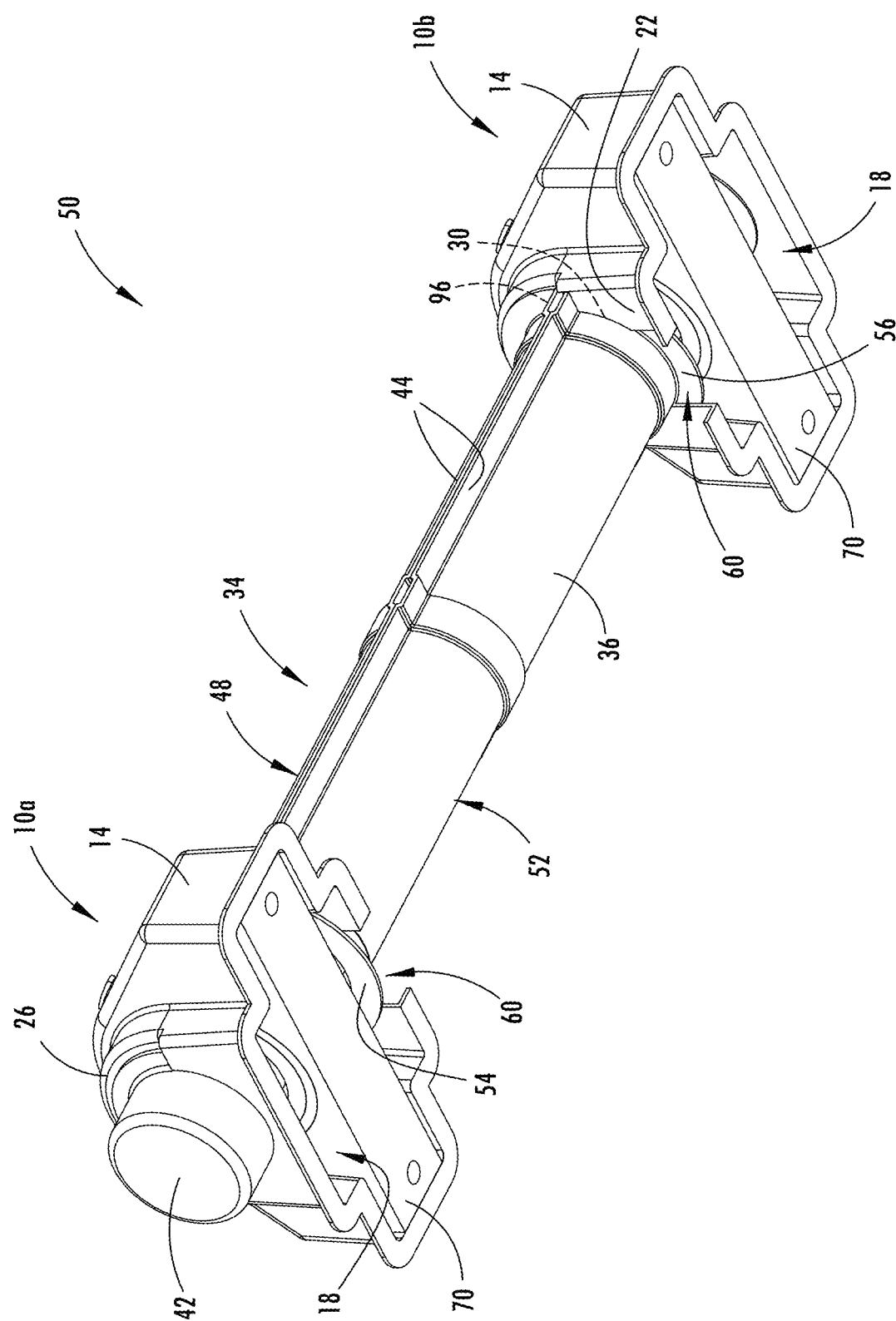
FIG. 1B is a bottom perspective view of the bearing guard and shaft guard assembly having the cap of FIG. 1A.

For purposes of description herein, the terms "upper," "lower," "right," "left," "rear," "front," "vertical," "horizontal," and derivatives thereof shall relate to the invention as oriented in FIGS. 1A and 1B. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1A-6B, reference numeral 50 generally denotes a guard assembly including a bearing guard 10 and a shaft guard 34. The bearing guard 10 comprises a housing 14 having an open end 18, a first face 22, and a second face 26. A first opening 30 is defined by the first face 22. The first opening 30 is configured to receive the shaft guard 34. A second opening 38 is defined by the second face 26. A cap 42 is positioned over the second opening 38 and is removably coupled to the second face 26. The cap 42 extends a predetermined distance from the second face 26.

Figure 2:
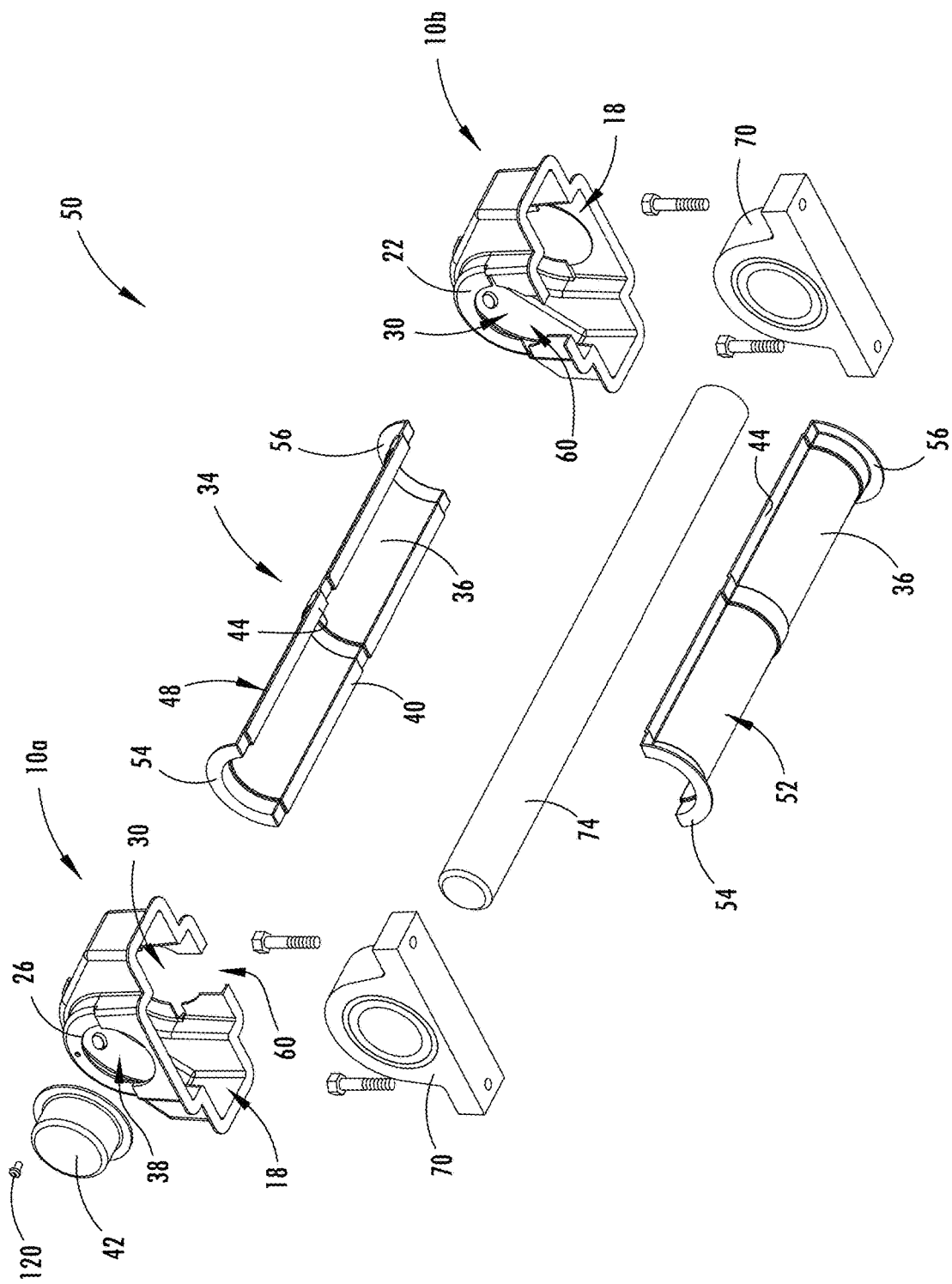
FIG. 2 is an exploded top perspective view of the bearing and shaft guard assembly of FIG. 1A including machinery received by the bearing and shaft guard assembly.

Referring to FIGS. 1A-2, a guard assembly 50 is shown having the shaft guard 34 positioned between first and second bearing guards 10a, 10b. Each of the first and second bearing guards 10a, 10b may have the same or substantially the same features as the bearing guard 10. The shaft guard 34 includes a body portion 36 and laterally opposing flanges 40, 44. In some examples, the shaft guard 34 may include a top portion 48 and a bottom portion 52, each having respective body portions 36 and flanges 40, 44 configured to mirror the other. In other examples, the shaft guard 34 may be a single piece with the top portion 48 and the bottom portion 52 integrally formed.

The shaft guard 34 has first and second edges 54, 56 received by the first and second bearing guards 10a, 10b, respectively. Each of the first and second edges 54, 56 are received by the first and second bearing guards 10a, 10b through the first opening 30 defined by the first face 22 of each of the first and second bearing guards 10a, 10b, respectively. A channel 60 is defined by the first face 22 of each of the first and second bearing guards 10a, 10b and is positioned to allow a coupling shaft 74 (FIG. 2) to slide through the channel 60 and be housed within the shaft guard 34 and the bearing guards 10a, 10b.

Still referring to FIGS. 1A-2, each of the first and second bearing guards 10a, 10b includes the second face 26. In some examples, the second face 26 of one of the first and second bearing guards 10a, 10b may be operably coupled to a cap 42. In other examples, the second face 26 of both the first and second bearing guards 10a, 10b may be operably coupled to a cap 42. In still other examples, the second face 26 of both the first and second bearing guards 10a, 10b may not be operably coupled to any cap 42.

Referring now to FIG. 2, each of the first and second bearing guards 10a, 10b includes an open end 18 configured to allow the bearing guards 10a, 10b to fit over bearings 70. In some examples, the bearings 70 are specifically pillow block bearings. However, it is contemplated that the bearing guards 10a, 10b may be configured to cover other types of bearings without departing from the scope of the present disclosure.

Each bearing block 70 is operably coupled to a coupling shaft 74 configured to be covered by the shaft guard 34. When the bearings 70 and the coupling shaft 74 are assembled together, the guard assembly 50, including the bearing guards 10a, 10b and the shaft guard 34, encase the coupling shaft 74 and the bearings 70. Each channel 60 is of a predetermined width to allow the coupling shaft 74 to slide through the channel 60 into engagement with the first and second bearing guards 10a, 10b. If an end of the coupling shaft 74 extends beyond the bearings 70 and the bearing guards 10a, 10b, caps 42 may be used to ensure that the coupling shaft 74 is fully covered.

Figure 3A:
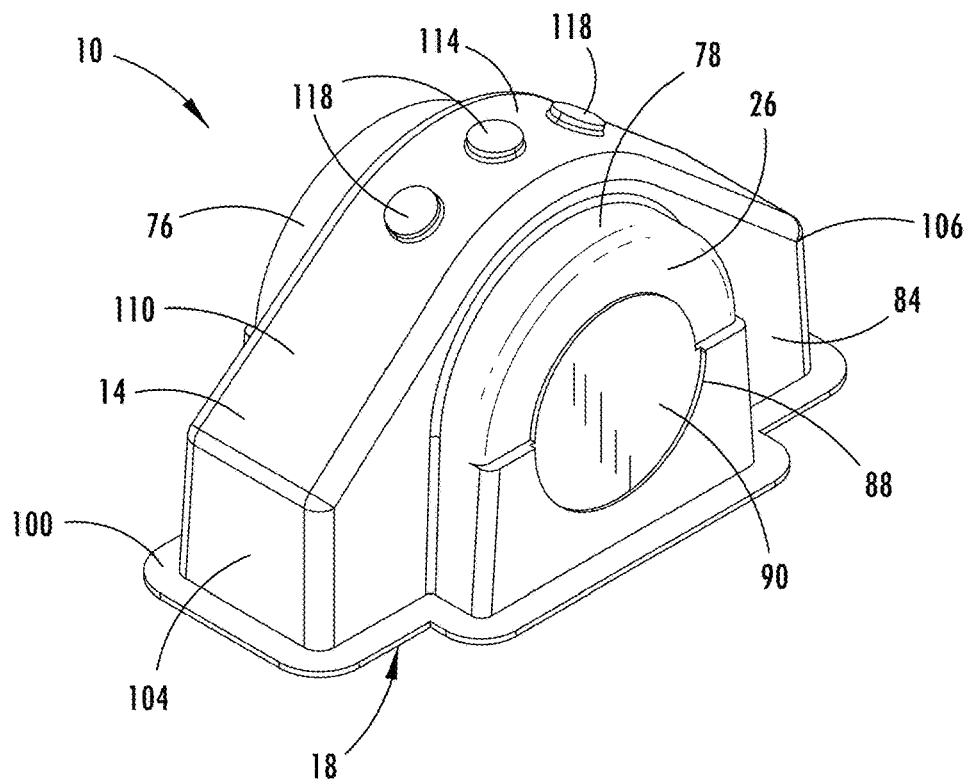
FIG. 3A is a first side perspective view of a bearing guard having one uncut face and one cut face.
Figure 3B:
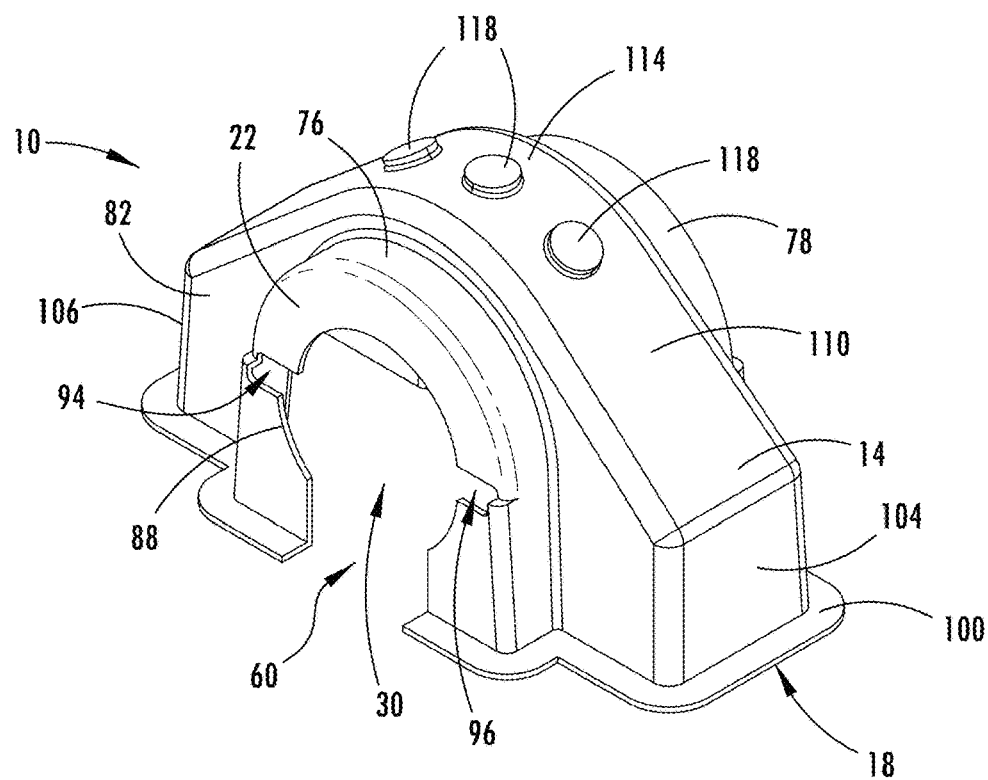
FIG. 3B is a second side perspective view of the bearing guard of FIG. 3A.
Figure 4A:
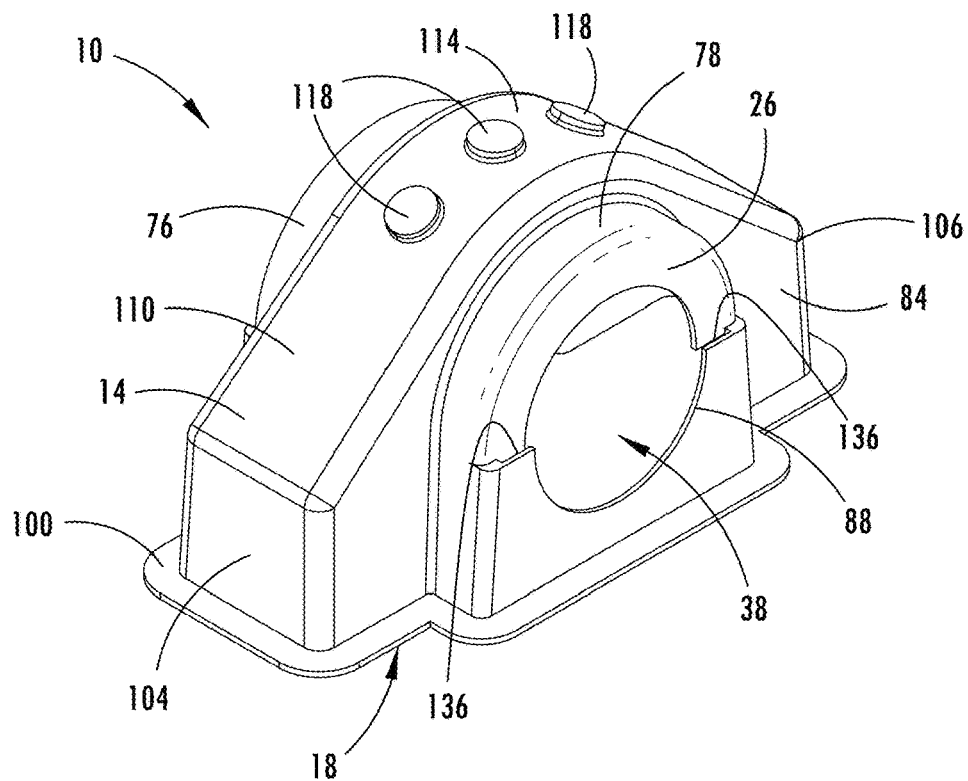
FIG. 4A is a first side perspective view of a bearing guard having two cut faces.
Figure 4B:
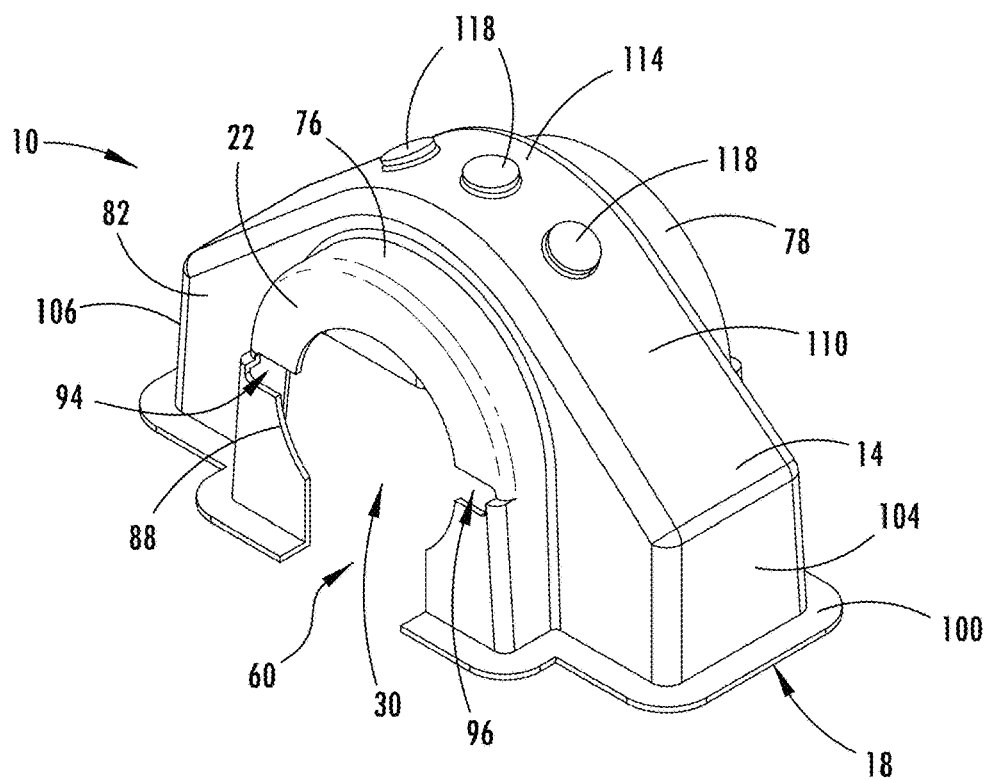
FIG. 4B is a second side perspective view of the bearing guard of FIG. 4A.
Figure 5A:
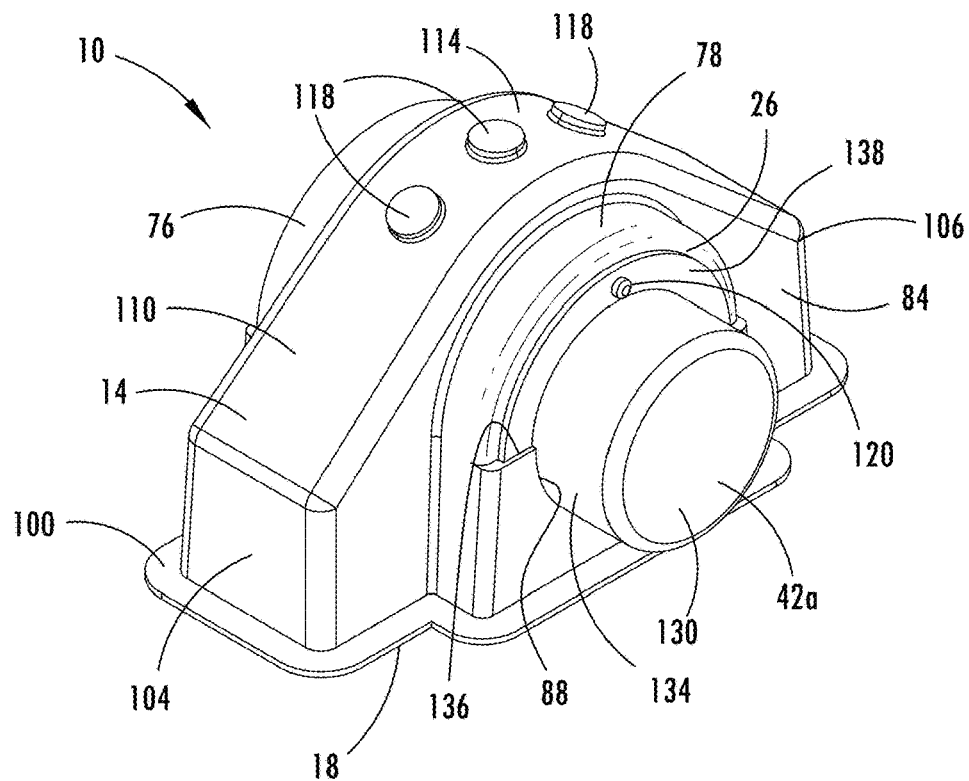
FIG. 5A is a first side view of a bearing guard having a first size cap.
Figure 5B:
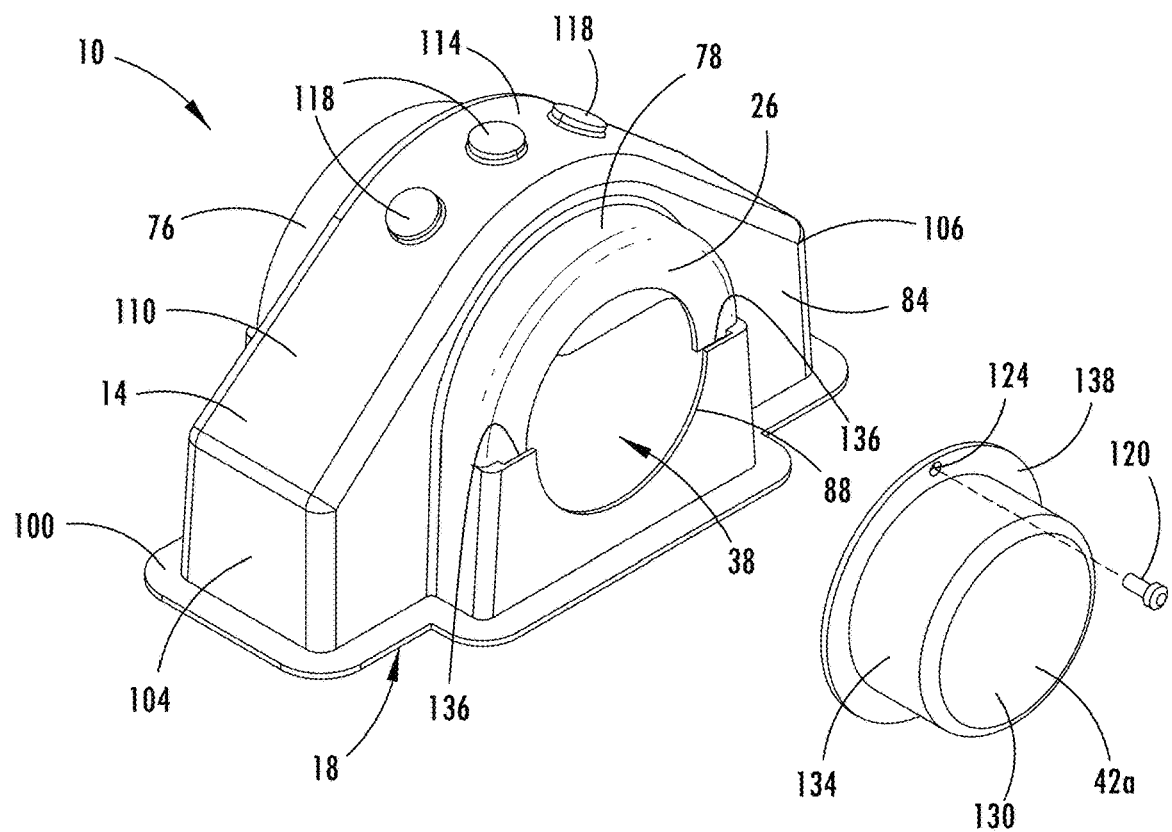
FIG. 5B is a second side view of the bearing guard and first size cap of FIG. 5A.
Figure 6A:
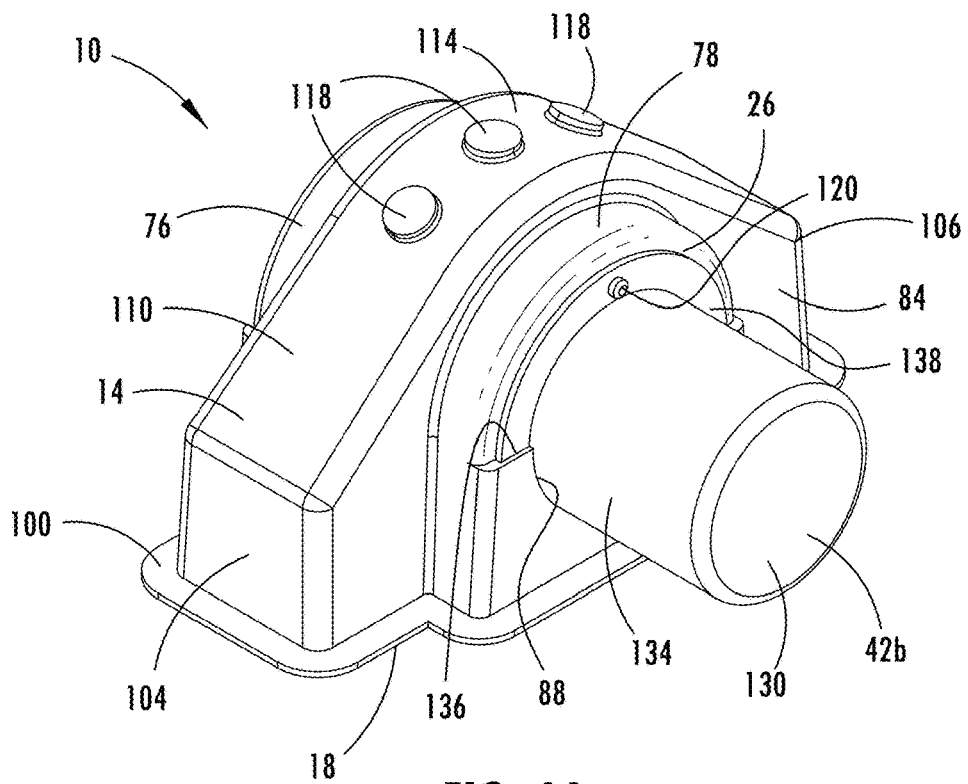
FIG. 6A is a first side view of a bearing guard having a second size cap.
Figure 6B:
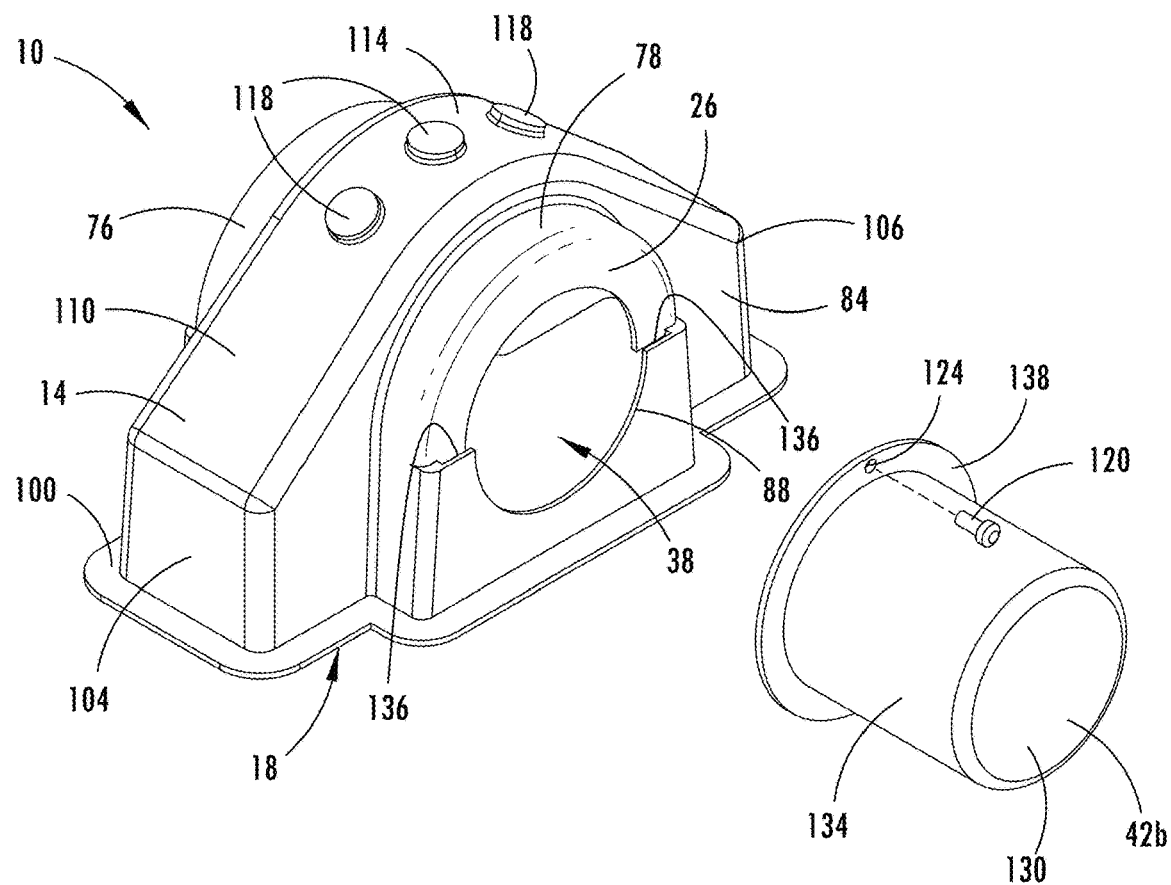
FIG. 6B is a second side view of the bearing guard and second size cap of FIG. 6A.

Referring now to FIGS. 3A-4B, the bearing guard 10 includes the first face 22 and the second face 26. Each of the first and second faces 22, 26 may be formed with one of a first and second extension 76, 78 extending from a first and second side 82, 84 of the housing 14, respectively. The first and second extensions 76, 78 may be generally arcuate in shape in some examples. In other examples, the first and second extensions 76, 78 may be generally rectangular or square. Each extension may include a lip 88 surrounding the lower half of a circular indention 90. When the first and/or second openings 30, 38 are cut out of the first and second faces 22, 26, respectively, the cut is made around the circumference of the indention 90. It is contemplated that the cut may be made to provide larger or smaller first and/or second openings 30, 38, depending on the dimensions of the shaft guard 34 and/or cap 42, which are shown in FIG. 2 coupled to the first and second openings 30, 38. In some examples, the second face 26 remains uncut, as shown in FIG. 3A.

The first face 22 of the bearing guard 10 further defines laterally opposing slots 94, 96 in communication with the first opening 30. The laterally opposing slots 94, 96 are configured to receive the laterally opposing flanges 40, 44 of the top portion 48 and bottom portion 52 of the shaft guard 34 and may receive portions of the first and second edges 54, 56, as shown in FIGS. 1A and 1B. The slots 94, 96 extend from the first opening 30 outward to the edge of the first face 22 and first extension 76.

The bearing guard 10 further includes the open end 18 surrounded by an outer edge 100 of the housing 14 of the bearing guard 10. The outer edge 100 provides a footing for the bearing guard 10. The outer edge 100 extends a predetermined distance from the housing 14 to provide stability and support to the bearing guard 10 when the bearing guard 10 is installed and in use.

The housing 14 of the bearing guard 10 includes the first side 82 and the second side 84 joined by first and second lateral sides 104, 106. The housing 14 further includes a top surface 110 extending from the tops of the first and second lateral sides 104, 106 at an angle predetermined by the shape and height of the bearing 70 to be covered. The top surface 110 includes a curved top 114 aligned with the first and second extensions 76, 78 of the housing 14 and may include rounded guides 118 for potential cutouts. When the guides 118 are cut out, access is provided to the bearings 70 to service grease fittings of the bearing 70.

Referring now to FIGS. 5A-6B, the bearing guard 10 may include a cap 42 operably coupled to the second face 26 and positioned over the second opening 38. The bearing guard 10 is compatible with caps 42 of multiple lengths (e.g., cap 42a, cap 42b) and the caps 42 may be interchangeable based on the customer's requirements or requests. The cap 42 may be secured to the bearing guard 10 by a fastener 120 configured to be received by a first receiving well 124 defined by the cap 42 and operably coupled with the second face 26.

Each cap 42 includes a front surface 130 integrally formed with a lateral surface 134 and an edge 138 extending from the lateral surface 134 and surrounding the cap 42. The edge 138 is positioned flush with the second face 26. The cap 42 is positioned such that the edge 138 is partially received by a slot 136 defined by the lip 88. When the edge 138 of the cap 42 is received by the slot 136, the edge 138 is positioned substantially flush with the second face 26. The lateral surface 134 of the cap 42 sits on the second opening 38 when the edge 138 is at least partially received by the slot 136. The lip 88 is configured to support the cap 42 when the cap 42 is operably coupled with the second face 26.

Referring again to FIGS. 1A-6B, in some examples, the bearing guard 10, including the housing 14 and the cap 42, may be formed of a polymer, for example, acrylonitrile butadiene styrene (ABS), polytetrafluoroethylene (PTFE), polycarbonate, or poly-vinyl-chloride. In other examples, the bearing guard 10 may be formed from an alloy, for example, steel.

The bearing guard 10 may be used to cover any type of block bearing 70 such as, for example, pillow block bearings. The bearing guard 10 coupled with the shaft guard 34 may prevent accidental contact with fast rotating shafts. The bearing guard 10 may further be easily and quickly removable to allow efficient repair of the bearings 70 and coupling shafts 74 covered. Many standards require guards, such as standards by the Occupational Safety and Health Administration (OSHA), the American Society of Mechanical Engineers (ASME), and the American National Standards Institute (ANSI), and the bearing guard 10 is configured to meet the standards outlined. The bearing guard 10 further provides flexibility in part choice for consumers, by allowing a consumer to purchase the bearing guard 10 without the first and second openings 30, 38 to subsequently cut the openings 30, 38 independently. The consumer may further purchase the bearing guard 10 with the first opening 30 precut. Additionally, the consumer may purchase the bearing guard 10 with the first and second openings 30, 38 precut. The consumer may further have options of caps 42 to purchase based on length of the coupling shaft 74 extending past the bearing 70 (see, for example, caps 42a, 42b in FIGS. 5A and 5B and FIGS. 6A and 6B, respectively). It is also possible for the consumer to purchase a premeasured cap 42 or have a custom measured cap 42 manufactured.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents

What is claimed is:

1. A guard assembly comprising:
    a bearing guard comprising:
        a housing having an open end, a first face, and a second face;
        a first opening defined by the first face;
        a pair of laterally opposing slots defined by the first face and in communication with the first opening;
        a second opening defined by the second face, the second opening aligned with the first opening; and
        a cap positioned over the second opening and removably coupled with the second face, wherein the cap extends a predetermined distance from the second face; and
    a shaft guard received within the first opening, wherein:
        the shaft guard includes a pair of laterally opposing flanges,
        the cap includes an outwardly extending, circumferential edge configured to abut the second face,
        the first face of the housing includes a first lip extending about a lower half of the first opening and the second face of the housing includes a second lip extending about a second half of the second opening, and
        an edge of the first lip is configured to support the pair of laterally opposing flanges and the second lip is configured to abut a lateral surface of the cap to at least partially support the cap.

2. The guard assembly of claim 1, wherein the bearing guard is configured to receive a bearing, and further wherein the shaft guard is configured to receive a coupling shaft.

3. The guard assembly of claim 1, wherein the cap is configured to receive an end of a coupling shaft.

4. The guard assembly of claim 1, wherein the bearing guard is one of a pair of bearing guards, and further wherein the shaft guard extends between the pair of bearing guards.

5. The guard assembly of claim 1, wherein the edge of the first lip at least partially defines that pair of laterally opposing slots, and further wherein the pair of laterally opposing flanges are at least partially received by the pair of laterally opposing slots to abut the edge of the first lip.

6. The bearing guard of claim 1, wherein the pair of laterally opposing flanges extend along the shaft guard between outwardly extending, circumferential edges of the shaft guard.

7. The bearing guard of claim 1, wherein the outwardly extending, circumferential edge of the cap is coupled with the second face by a fastener.

8. A bearing guard for a guard assembly, comprising:
    a housing having an open end, a first face having a first lip, and a second face having a second lip;
    a first opening defined by the first face;
    a second opening defined by the second face, wherein the second lip extends at least partially about the second opening; and
    a cap positioned over the second opening and removably coupled with the second face, wherein the cap extends a predetermined distance from the second face, and wherein the cap includes an outwardly extending, circumferential edge configured to abut the second face, and wherein the second lip abuts a lateral surface of the cap and at least partially supports the cap, and further wherein the cap is coupled with the second face by a fastener.

9. The bearing guard of claim 8, further comprising:
    a shaft guard coupled with the first face and including first and second ends, wherein first and second laterally opposing flanges extend outward from and along the shaft guard between the first and second edges, and wherein the first and second ends each include an outwardly extending, circumferential edges.

10. The bearing guard of claim 9, wherein the first lip includes an edge at least partially defining first and second slots in communication with the first opening, wherein the edge of the first face lip is configured to abut first and second laterally opposing flanges of the shaft guard.

11. The bearing guard of claim 8, wherein the first face defines a channel in communication with the first opening, and further wherein the channel has a width configured to allow the housing to fit over a bearing and a coupling shaft, the coupling shaft at least partially received through the channel.

12. A bearing guard for a guard assembly, comprising:
    a housing having an open end, a first face, and a second face, wherein the first face is integrally formed with a first lip and the second face is integrally formed with a second lip;
    a first opening defined by the first face;
    a second opening defined by the second face;
    a pair of laterally opposing slots defined by the first face and in communication with the first opening; and
    a cap positioned over the second opening, wherein the cap includes an outwardly extending, circumferential edge configured to abut the second face, wherein the second lip defines a slot configured to receive the edge of the cap, and wherein the cap rests on the second lip, and further wherein the outwardly extending, circumferential edge of the cap is coupled with the second face by a fastener.

13. The bearing guard of claim 12, wherein the cap comprises a first cap including a lateral surface extending perpendicular from the edge of the first cap and configured to be removably coupled with the second face, wherein the lateral edge extends a first length.

14. The bearing guard of claim 12, wherein the open end of the bearing guard is surrounded by an outer edge of the housing.

15. The bearing guard of claim 12, wherein the first face is spaced apart from the second face by a top surface, the top surface being at least partially curvilinear.

16. The bearing guard of claim 12, wherein each of the first and second faces are formed with one of a first extension and a second extension, respectively, and further wherein the first and second extensions extend from one of a first side and a second side of the housing, respectively.

\* \* \* \* \*